April 24, 1928.

W. M. BAXTER

1,667,023

REMOVABLE BODY TRUCK

Filed Aug. 14, 1922

W. M. BAXTER

1,667,023

REMOVABLE BODY TRUCK

Filed Aug. 14, 1922

Patented Apr. 24, 1928.

1,667,023

UNITED STATES PATENT OFFICE.

WILLIAM M. BAXTER, OF CHICAGO, ILLINOIS, ASSIGNOR TO IDEAL REMOVABLE BODY COMPANY, OF CHICAGO, ILLINOIS, A CORPORATION OF ILLINOIS.

REMOVABLE-BODY TRUCK.

Application filed August 14, 1922. Serial No. 581,565.

This invention pertains in general to trucks and similar vehicles and has reference more particularly to trucks of the removable body type.

The employment of trucks equipped with removable and interchangeable bodies which can be loaded or unloaded in a warehouse while the truck chassis is transporting a previously loaded body, effects a considerable saving in truck time with a consequent reduction in transportation costs, for the reason that the chassis may be kept busy and the loading and unloading of the bodies may be done when convenient. Furthermore, the bodies may be wheeled about the warehouse and loaded or unloaded directly from or onto the pile of material in the warehouse, thus eliminating the hand trucking and consequent handling and rehandling of the goods.

While I am aware that trucks of this general type have heretofore been employed, such for instance as disclosed in U. S. Patent No. 1,293,664, granted February 11, 1919, my present invention aims to improve the construction and operation of the apparatus by adding certain features and improving other structural details, as will be later explained.

One of the features of my invention resides in the mounting of the rollers upon which the truck body is rolled from and onto the truck chassis, the rollers being so mounted that they are yieldable laterally relatively to the body to facilitate the body movements without undue cramping and binding between the rollers and the track rails.

Another feature of my invention is the addition to the body of supporting caster rollers upon which the body may be easily moved about the loading platform or warehouse in any direction, these rollers being adjustable from operative to inoperative position at will by the manipulation of a single controlling means.

Another purpose of my invention is to facilitate the movement of the body onto and off from the chassis which result is accomplished by laterally flaring the ends of the track rails and also the forward end of the rack by which the body is moved through the instrumentality of a pinion meshing therewith, this flaring serving to permit movement of the body onto the chassis even though it be not exactly in alignment therewith.

Another purpose of my invention is to provide means which will ensure the engagement of the operating pinion with the body rack, the construction being such that the pinion will be yieldingly held in mesh with the rack irrespective of vertical movements of the rack during its travel, and furthermore, provision is made whereby, through the intermediary of said pinion, the rear end of the body may be lifted to enable it to be rolled onto a platform which may be higher than the track rails of the chassis.

A further feature of my invention resides in the fact that the actuation of the pinion which meshes with the rack, and also the up and down movements of this pinion, may be effected from a point near the front of the truck by mechanism which is always accessible and cannot be rendered inaccessible by the proximity of a platform to the rear end of the truck.

A still further feature is that both the rotative and bodily movements of the pinion are produced by the manipulation of a single handwheel which, through manipulation of a clutch shifting lever, is connected to one or the other of a train of mechanisms at will, both of said mechanisms being self-locking so that no independent locking device is required.

Still another feature of my invention is the provision of yieldingly mounted hold down hooks which serve the dual function of yieldingly braking and stopping the movement of the body as it approaches its forward limit of movement and also of holding down the rear end of the body while in transit to prevent it from becoming disengaged from the chassis, the yieldability of the hooks permitting, however, a limited but desirable degree of flexibility of the structure.

Other objects and advantages of my invention should be readily apparent as the same becomes better understood by reference to the following description when considered in connection with the accompanying drawings.

Referring to the drawings.

Referring to the drawings more in detail, reference character 15 indicates the side members of the chassis frame, which may be of any preferred construction, the members being customarily connected at their rear ends by a transverse member 16 and suitably tied at their front ends and at intermediate points, if desired. Upon the chassis frame there is rigidly mounted a longitudinally extending track consisting of rails 17 which are preferably of angle shape, the upturned flange 18 forming a guard which precludes lateral displacement of the rollers upon which the removable body is supported. At its rear end each of these track rails comprises a flared portion 19, of considerable width at its rear end to accommodate the rollers of the body and permit the same to be rolled onto the chassis even though it be not accurately aligned therewith. The flared portions of the track will receive the rollers and the guard flanges will guide the same so that as the body is moved onto the chassis, it will become aligned therewith and disposed squarely upon the track rails.

The removable truck body comprises a platform or floor and preferably detachable sides made, if desired, in sections as indicated by reference characters 21, 22 and 23, all carried upon the frame structure comprising side members 24 connected by front and rear cross members 25 and 26, suitably braced by gusset plates of other preferred means. Within this frame there are mounted the forward and intermediary axles 27 and 28 carrying the supporting rollers 29 disposed between the frame members 24 and held against displacement longitudinally of the axis.

Figures 2, 3:
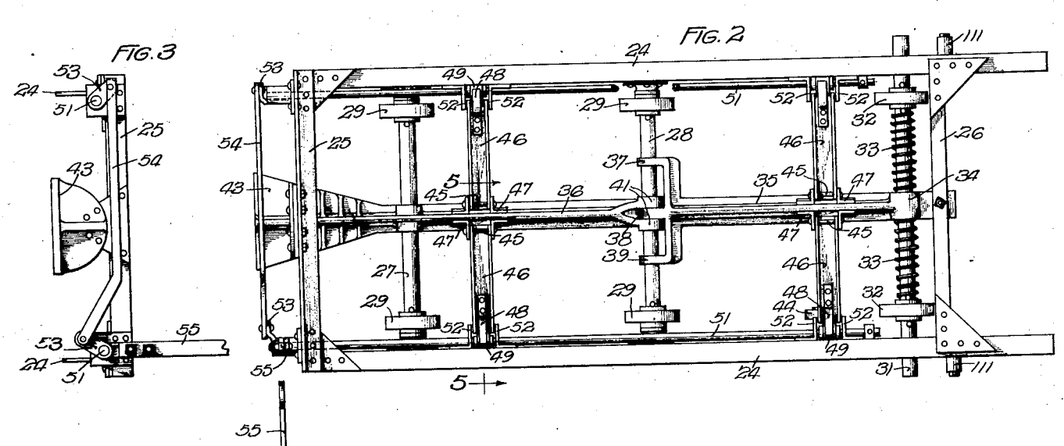
Fig. 2 is a top plan view of the removable body frame structure.
Fig. 3 is an end view looking toward the right at Fig. 2.

While the axles 27 and 28 are fixed with respect to the body frame, the rear axle 31 projects through bearing openings in the side members 24 so that it is capable of longitudinal sliding movement therein. Upon this axle are rotatably mounted the rollers 32 held against displacement longitudinally of the axle by pins or other suitable means, the whole axle structure, including the rollers, being normally maintained in alignment with the rollers 29, as shown in Fig. 2, by coiled expansion springs 33 disposed between the rollers and an eye 34 formed in the web of the member 35 which will be later described more in detail. These springs yieldingly retain the axle and rollers thereon in normal position but if during the loading movements of the body, the rollers should not be exactly in alignment with the track rails, one or the other of the rollers 32 would engage the guard flange of the flared portion of its track, whereupon, instead of rigidly binding so as to render further movement of the body extremely difficult, the whole shaft will move endwise in the frame hence permitting the loading movement of the body to be continued without noticeable opposition or retardation, and the action of the springs will yieldingly and gradually align the body with the chassis during the continuance of its movement onto the chassis. These yieldably mounted rollers serve, therefore, not only the function of supporting the rear end of the body, but also as yieldingly acting aligning instrumentalities which align the truck body on the chassis without cramping or materially interfering with the progress of the body onto the chassis.

Figures 4, 5:
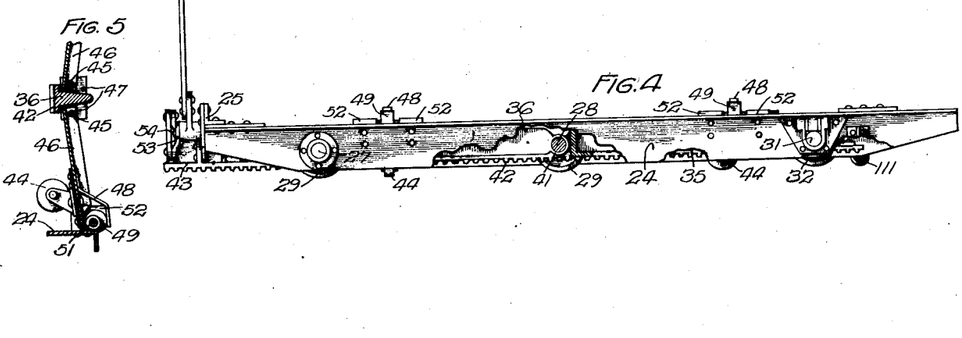
Fig. 4 is a side elevation of the body frame, certain portions being broken away.
Fig. 5 is a fragmentary sectional view on the line 5—5 of Fig. 2.

Intermediate the side members of the body frame there is disposed a longitudinally extending rack comprising the rear member 35 and the forward member 36. The rear member has three eyes 37, 38 and 39 which embrace the intermediate axle 28, and the forward member has a pair of eyes 41, also embracing this axle by which the connected ends of the rack sections are retained in position. While the rack might be made in one piece, it is preferably constructed as shown, so that a standard forward section 36 may be employed on all installations and the rear section may be of a length commensurate with the length of the body. The lower face of this rack is equipped throughout its length with teeth 42, as will be apparent from Fig. 4, and its forward end is flared, as indicated at 43, the teeth extending transversely throughout the width of this flared portion, so that the rack will engage with the operating pinion at the beginning of the loading movement of the body, irrespective of whether or not the body is exactly aligned with the chassis. This flared portion of the rack in conjunction with the flared portions of the track rails facilitate the loading movement of the body onto the chassis to a considerable degree and constitute a marked improvement over the straight, narrow rack and track rails heretofore employed.

For the purpose of enabling the body to be rolled about in the warehouse or on a loading platform with ease in any desired direction, I have provided a number of, in the present instance four, caster rollers 44, which are adapted to be elevated into inoperative position above the plane of the bottom of the rollers 29 and 32, as shown in the drawings, or to be depressed into engagement with the floor or platform so as to clear the rollers 29 and 32 from the floor and carry the weight of the body. With this end in view, each of the rollers 44 is swiveled upon the bottom of a channel bar 46 which in operation is pivoted at its inner end at 45 in a bracket 47 carried by the rack. The outer end of each channel bar is provided with a strap 48 between which and said bar is disposed a cam 49 carried upon a longitudinally extending rod 51 journaled in bearing brackets 52 projecting inwardly from the frame members 24. The forward end of each rod has fixedly secured thereto a lever arm 53, one projecting upwardly and the other downwardly, these arms being connected by a link 54. An operating lever 55 secured to one of the rods 51 at the forward end of the body frame may be swung so as to rock the rods and the cams secured thereon to raise or lower the caster rollers 44 at will. During loading and unloading movements of the body, the rollers are disposed in elevated position, as shown in the drawings, but when the body has been removed from the chassis, the lever 55 is rocked to lower the caster rollers below the plane of the rollers 29 and 32 thereby assuming and entirely carrying the weight of the body which may be readily moved about in any desired direction upon these caster rollers.

Figure 1:
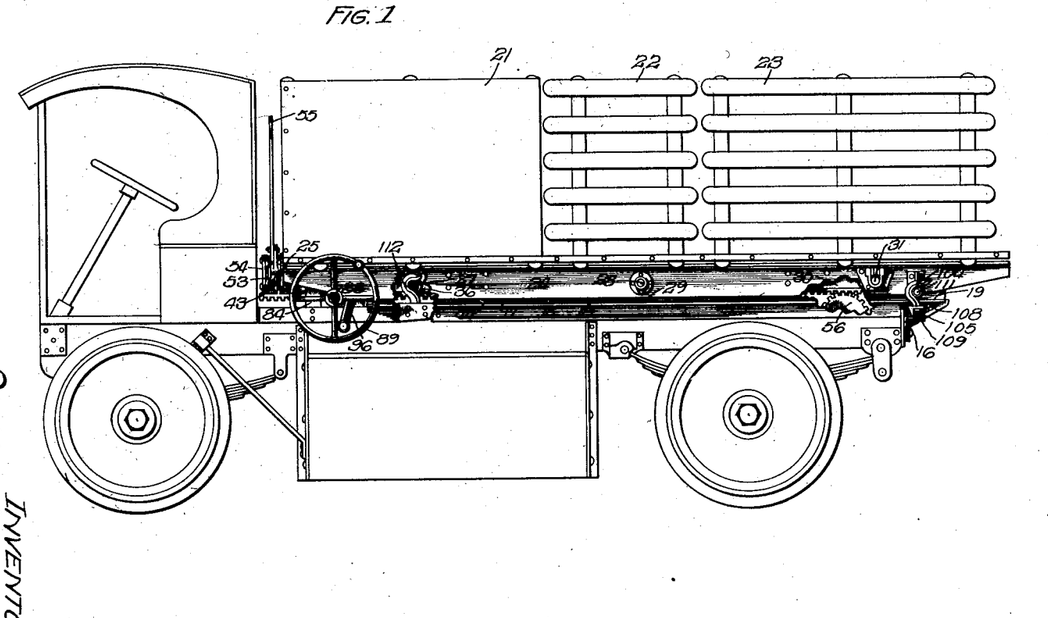
Fig. 1 is a side elevation of a truck embodying my invention.
Figures 6, 7, 8:
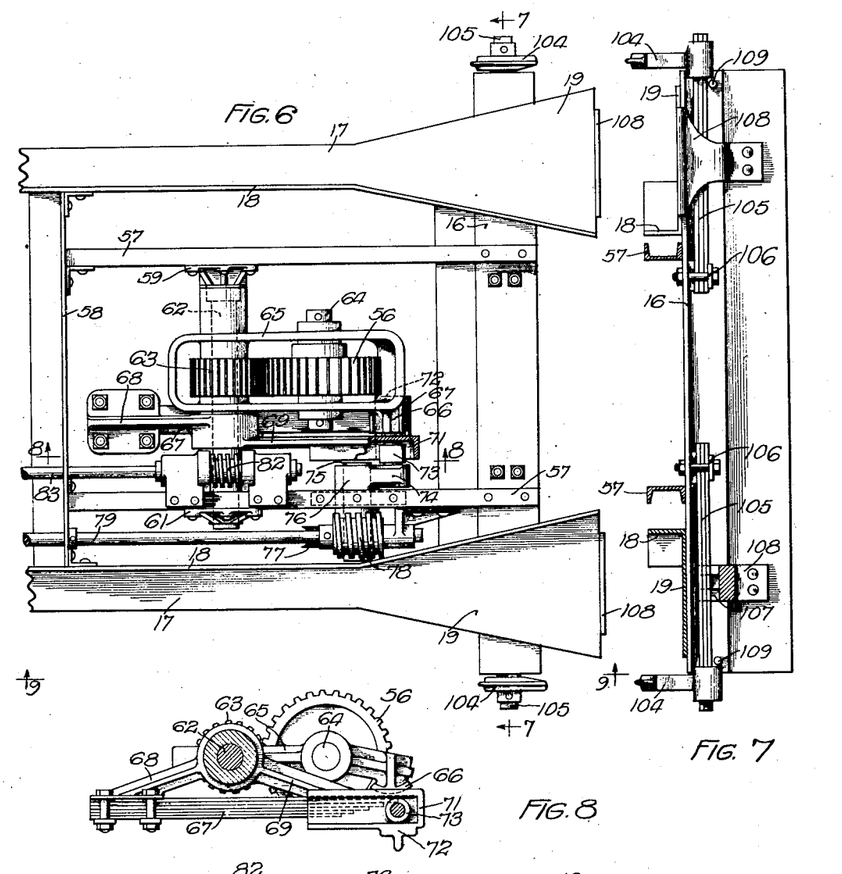
Fig. 6 is a fragmentary plan view of the rear end of the chassis, showing the operating mechanism.
Fig. 7 is a sectional view on the line 7—7 of Fig. 6.
Fig. 8 is a sectional view on the line 8—8 of Fig. 6.
Figure 9:
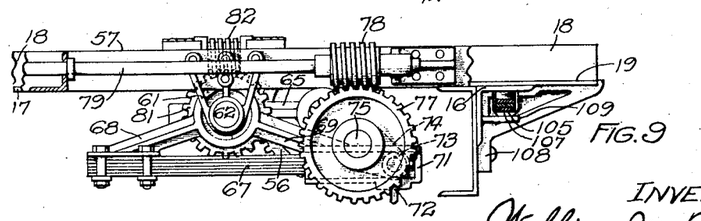
Fig. 9 is a view taken on the line 9—9 of Fig. 6.

For the purpose of moving the body onto and off from the chassis, I have provided operating mechanism, including a pinion, which is adapted to mesh with the teeth 42 of the longitudinally extending rack carried by the body, and this pinion which is indicated by reference character 56, is shown in Fig. 1 in engagement with the rack, the details of the operating mechanism being best illustrated in Figs. 6, 8 and 9.

Referring to these figures, it will be apparent that between sub-frame members 57 extending longitudinally of the chassis, between the cross members 16 and 58, I have mounted in suitable bearings 59 and 61 carried by the members 57, a rotatable shaft 62 and fixed thereon is a spur gear 63 meshing with the pinion 56. The pinion 56 is journaled upon a shaft 64 which is carried in a yoke 65 fulcrumed upon the shaft 62 and, at a point remote from this shaft, the yoke is provided with a laterally and downwardly projecting boss or bearing portion 66 adapted to overlie and rest upon a heavy multi-leaf spring 67, securely clamped to and carried by an arm 68 of a bell crank lever 70 also fulcrumed upon the shaft 62 at one side of the yoke 65, as will be apparent from Fig. 6. The other arm 69 of the bell crank lever is provided near its outer end with a channel-shaped guide way 71 from the under side of which a rigid arm or extension 72 projects laterally beneath the spring 67, as shown in Figs. 6 and 8.

A roller 73 carried by a crank arm 74 is engaged in the guide way 71, the crank arm being fixed upon the inner end of a shaft 75 journaled in a suitable bearing 76 and equipped at its other end with a worm gear 77 which meshes with and is adapted to be driven by a worm 78 mounted upon a longitudinally extending shaft 79.

To raise the pinion 56 into mesh with the rack 35, the worm gear 77 is given a rotary movement by the worm 78 which is actuated through the shaft 79 from a point near the forward end of the chassis, as will be later explained, to thereby swing the crank 74 upwardly carrying with it the guide way 71. This upward movement of the guide-way rocks the bell crank lever in a counter-clockwise direction, viewing Figs. 8 and 9, thereby lifting the outer or right hand end of the spring 67, which, through its engagement with the boss 66, yieldingly elevates the yoke 65 and thereby the pinion 56. The pinion is yieldingly held in this elevated position by the spring 67 so that it will mesh with the rack irrespective of limited vertical movements of the rack.

In case the platform onto which the body is to be rolled from the truck chassis is slightly higher than the rear end of the chassis, the rear end of the body may be elevated to enable movement thereof onto the platform. This elevation of the body is effected through the pinion 56 which is raised the required distance by the mechanism just described, carrying the body upwardly with it. Should the body be so heavily loaded that the weight thereof cannot be lifted by the spring 57, this spring will flex until during the upward travel of the guide way 71, the projecting arm 72 engages the lower face of the spring. A direct contact is then effected between this arm and the boss 66 through the interposed spring and continued upward movement of the arm will carry the pinion 56 upwardly lifting the loaded body to the required height.

Rotation of the pinion 56 to move the body longitudinally of the chassis is effected through rotation of the spur gear 63 fixed on the shaft 62 to the outer end of which shaft there is secured a worm wheel 81 meshing and driven by a worm 82 mounted upon a forwardly extending shaft 83. When the pinion is meshed with the rack, rotation of the shaft 83 in one direction or the other will move the body longitudinally of the chassis onto or off from the same, as may be desired.

The shafts 79 and 83 extend longitudinally of the chassis to a point near the forward end thereof where these shafts are journaled in suitable bearings carried by a casing 84 which is mounted on a casting 85 extending between and riveted or otherwise securely attached to the side members 15 of the chassis frame.

The casing 84 provides a closed housing adapted to contain lubricant in which the power transmission mechanism for the shafts 79 and 83 is mounted. This mechanism comprises a skew gear 86 meshing with and adapted to be driven by a companion gear 87 loosely mounted upon the transversely extending shaft 88 which is provided at its outer end with an operating hand-wheel 89, shown in Fig. 1. Shaft 83 is similarly provided with a skew gear 91 meshing with and adapted to be driven by a companion gear 92 also loosely mounted on the shaft 88. The gears 87 and 92 are provided with opposed clutch faces 93 and 94 respectively, adapted to be alternately engaged and connected to the shaft 88 by a clutch member 95 splined to the shaft 88 between the clutch faces. When the clutch member 95 is moved to the left, as shown in Fig. 11, the gear 92 will be connected to the shaft 88, and when the clutch member is moved to the right, the gear 92 will be disconnected from the shaft and gear 87 connected thereto, as will be apparent. For the purpose of shifting the clutch member 95, I have provided a shift lever 96 fulcrumed within the casing at 97 and provided with an extension 98 to which is secured a leaf spring clutch shifting member 99 carrying at its free end a bifurcated yoke 101 which engages in the peripheral groove of the clutch member 95. Upon movement of the lever 96 about its fulcrum in a counter-clockwise direction viewing Fig. 10, the clutch member 95 will be moved to the right, and if the clutch teeth of the clutch member and the opposed clutch face are not aligned, the spring member 99 will yield sufficiently to permit a full thrust of lever 96, and when the teeth are subsequently brought into alignment, they will be snapped into interengaging relation by the resiliency of the member 99. Suitable means may be employed for locking the lever 96 in the two positions to which it may be shifted, and in the present instance, I have illustrated for this purpose a spring pressed latch 102 adapted to yieldingly engage a slotted extension 103 formed on the lever 96.

Figures 10, 12:
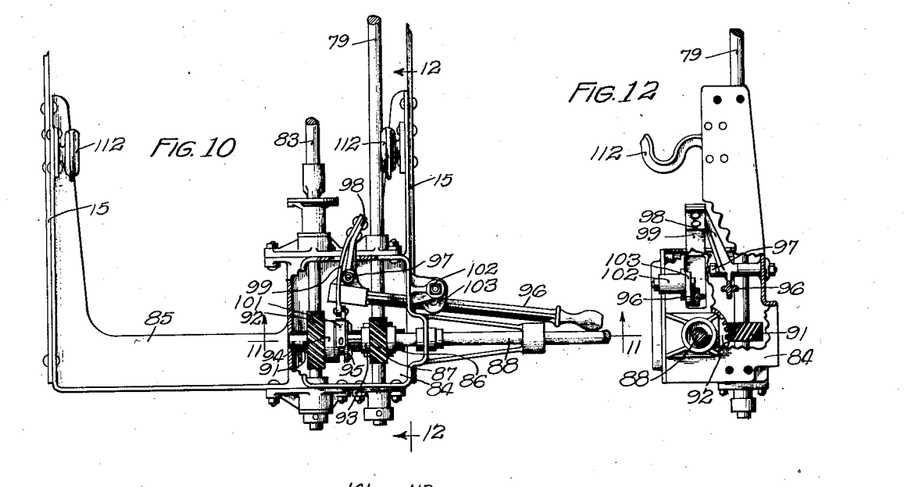
Fig. 10 is a plan view of the forward portion of the chassis frame structure and the operating mechanism mounted thereon.
Fig. 12 is a sectional view on the line 12—12 of Fig. 10.
Figure 11:
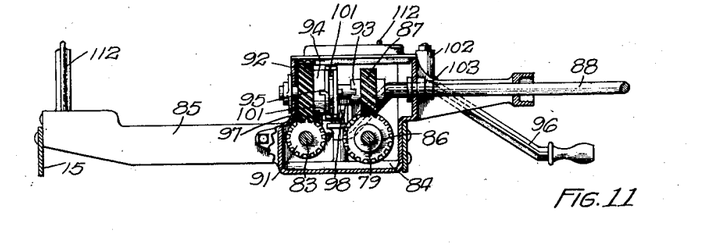
Fig. 11 is a sectional view on the line 11—11 of Fig. 10.

When it is desired to raise or lower the pinion 56, the clutch shift lever 96 is swung in a counter-clockwise direction viewing Fig. 10 to connect the gear 87 with the shaft 88, whereupon the handwheel 89 may be turned in the desired direction to raise or lower the pinion through the intermediary of the train of mechanism previously explained. When loading or unloading movement of the truck body is desired, the clutch will be shifted to disconnect the gear 87 and connect the gear 92 with the shaft 88. The worm and worm wheel drive between the shaft 79 and the shaft 75 will automatically lock the pinion into the position into which it has been adjusted, this worm and wheel being of the irreversible type, and the handwheel may now be manipulated to rotate the spur gear 63 thereby rotating the pinion 56 to impart the desired movements to the body.

For the purpose of yieldingly breaking the final forward movement of the body onto the chassis, and for the further purpose of holding down the rear end of the body so that it cannot be disengaged from the chassis, but at the same time may be permitted a limited degree of flexibility, I have mounted at the rear end of the chassis frame and at each side thereof, a hold down hook 104. Each of these hooks is mounted upon the outer end of a leaf spring 105 secured at its inner end by a clamp 106 to the frame member 16, each spring being extended through a slot 107 in the rear bracket member 108 and being limited in its upward movement by the member 16 and in its downward movement by a pin 109 projecting outwardly from this member beneath the spring. The frame side members are each provided with a laterally extending lug 111 preferably equipped with a roller which is adapted to enter beneath its respective hook 104 as the body approaches the forward limit of its movement. The cam shape of these hooks, in conjunction with springs upon which the hooks are mounted, provides a braking action which slows down the movement of the body and brings it gently to rest without objectionable shocks and jars. These hooks serve also, when the truck is in transit, to yieldingly hold down the rear end of the body, thereby preventing disengagement or displacement of the body from the chassis, but permitting a limited and desirable degree of flexibility between the body and the chassis.

The forward end of the body is locked to the chassis by a pair of hooks 112 fixed to the frame of the chassis near the front end in position to receive the front axle 27 of the body frame. The body is, therefore, held to the chassis at its forward end by the hooks 112 and at its rear end by the hooks 104.

My invention, its construction, mode of operation and many of its inherent advantages should be understood from the foregoing without further description, and while I have shown and described a preferred embodiment thereof, obviously the details may be varied within considerable limits without departure from the essence of the invention as defined in the following claims.

I claim:

1. In a removable body truck, the combination of a chassis frame provided with a track, a removable body, and laterally yieldable supporting rollers mounted upon said body in position to engage said track.

2. In a removable body truck, the combination of a chassis frame, a removable body, supporting rollers disposed beneath said body, and means for yieldably mounting said rollers so as to permit movement thereof laterally of the body.

3. In a removable body truck, the combination of a chassis frame, track rails comprising guard flanges carried by said frame, a removable body, and a plurality of supporting rollers yieldably mounted on said body so as to be capable of movement laterally with respect to the body upon engagement with one of said guard flanges.

4. In a removable body truck, the combination of a chassis frame provided with track rails, a removable body, an axle carried thereby, supporting rollers mounted on said axle, and spring means for yieldably maintaining said rollers in normal position, but permitting movement thereof transversely of the body upon engagement with said track rails.

5. In a removable body truck, the combination of a chassis frame provided with track rails, a removable body, an axle extending transversely of said body and slidably connected thereto, a pair of rollers mounted on said axle in position to engage said track rails, and springs for yieldably holding said axle and rollers in predetermined position with respect to said body.

6. A removable body truck, comprising a chassis frame provided with track rails laterally flared at their rear ends, and a removable body provided with laterally self-adjusting rollers and adapted to be supported upon said rails.

7. A removable body truck, comprising a chassis frame provided with track rails flared at their rear ends, a pinion mounted on said chassis frame, and a removable body provided with rollers adapted to travel upon said track rails and with a longitudinally disposed rack adapted to mesh with said pinion, said rack being laterally flared at its forward end.

8. A removable body truck, comprising a chassis frame provided with track rails, a removable body, supporting rollers mounted on said body in position to travel upon said track rails, a rack attached to and extending longitudinally beneath said body, and a pinion on said chassis adapted to mesh with said rack, said track rails being of increased width at their rear ends and said rack being of increased width at its forward end to facilitate the travel of said body onto said chassis.

9. A removable body truck, comprising a chassis frame, a removable body frame, a pinion mounted on the chassis frame, and a longitudinally extending rack mounted on the body frame in position to mesh with said pinion, said rack comprising a plurality of sections disposed in longitudinal alignment and flexibly connected together.

10. A removable body truck, comprising a removable body frame, including longitudinally extending side members, axles extending transversely between said side members, supporting rollers mounted on said axles, and a rack extending between said side members, said rack including front and rear sections provided with interengaging eyes embracing one of said axles.

11. In a removable body truck, the combination of a chassis frame including side and end members, track rails supported on said frame a body movable on said rails, bracket members supporting the rear ends of said rails, leaf springs secured at their inner ends to the rear end member of the frame and projecting laterally of the frame through said bracket members, and a cam-shaped hold down hook mounted upon the outer end of each spring in position to retain the removable body on said chassis.

12. A removable body truck, comprising a chassis, a removable body adapted to be supported thereby, a plurality of caster rollers mounted on and beneath said body, and means for simultaneously lowering and raising said rollers with respect to said body into operative and inoperative positions at will.

13. A removable body truck, comprising a chassis, a body removably mounted thereon, swiveled supporting rollers adjustably mounted on said body and adapted to be lowered to support the weight of the body or to be raised into inoperative position, and means for simultaneously lowering a plurality of said rollers.

14. In a removable body truck, the combination of a chassis frame, a pinion adjustably mounted thereon, a removable body, a rack carried thereby and adapted to mesh with said pinion, means for rotating said pinion, and means for adjusting said pinion, said last mentioned means including a spring adapted to exert a limited upward thrust to said pinion and a member cooperative with said spring to move said pinion and spring beyond the effective action of said spring.

15. In a removable body truck, the combination of a chassis frame, a removable body provided with a rack, a pinion adjustably mounted on said chassis frame in position to engage and actuate said rack, means including a worm drive for rotating said pinion, and means for vertically adjusting said pinion, said means including a bell crank lever, a spring carried thereby in position to exert an upward thrust upon the pinion, worm driven means for rocking said bell crank lever, and a lifting arm fixed to said bell crank lever to raise said pinion beyond the point to which it has been raised by the maximum thrust of said spring.

16. In a removable body truck, the combination of a chassis frame, a body removably disposed thereon, a rack carried by said body, a pinion adjustably mounted on said chassis frame, a spring for yieldably urging said pinion into engagement with said rack, means for adjusting the position of said spring, and means directly engaging said spring for positively lifting said pinion after the maximum thrust of said spring has been exerted thereon, whereby to lift said body relatively to the chassis.

17. In a removable body truck, the combination of a chassis frame, a shaft extending transversely thereof, a worm wheel and a spur gear fixed on said shaft, a worm for actuating said shaft, a yoke pivoted on said shaft, a pinion carried by said yoke and meshing with said spur gear, a rack adapted to mesh with said gear, a removable body to which said rack is secured, a bell crank lever, a spring carried by one arm thereof and adapted to engage the yoke, a guide way formed in the other arm of said bell crank lever, a crank pin engaged in said guide way, a worm and worm wheel for actuating said crank pin to rock said bell crank lever, and an arm rigidly carried by said bell crank lever in position to engage said yoke when said spring has been flexed to a predetermined degree.

18. In a removable body truck, the combination of a chassis, a pinion adjustably mounted thereon, a removable body provided with a rack adapted to mesh with said pinion, means including a shaft extending longitudinally of the chassis whereby said pinion may be adjusted, means including a shaft extending longitudinally of the chassis whereby said pinion may be rotated, an operating member mounted near the forward end of the chassis, and means whereby said member may be operatively connected with either of said shafts at will.

19. In a removable body truck, the combination of a chassis frame, a pinion adjustably mounted thereon, a removable body, a rack on said body adapted to mesh with said pinion, means for adjusting and rotating said pinion, including an adjusting shaft and a rotating shaft extending longitudinally of the chassis, a transverse shaft mounted near the forward end of the chassis, an operating wheel fixed on said shaft, and means for connecting and disconnecting said transverse shaft at will with said operating and rotating shafts.

20. In a removable body truck, the combination of a chassis, a pinion adjustably carried thereby, a removable body, a rack on said body adapted to mesh with said pinion, means for rotating and adjusting said pinion, comprising rotating and adjusting shafts extending longitudinally of the chassis, a handwheel mounted near the forward end of the chassis, and operative connections between said handwheel and said shafts including a shiftable clutch whereby either of said shafts may be connected to said wheel at will.

21. In a removable body truck, the combination of a chassis, a pinion adjustably and rotatably mounted thereon, a removable body, a rack on said body adapted to mesh with said pinion, means for adjusting and rotating said pinion, comprising a pair of shafts extending longitudinally of the chassis, a gear case mounted on said chassis near the forward end thereof into which said shafts project, a transverse shaft projecting into said gear case, and driving connections between said transverse shaft and said longitudinally extending shafts including a gear fixed to each of said longitudinally extending shafts, a pair of gears loosely mounted on said transverse shaft and meshing with said first mentioned gears, and a clutch member splined to said transverse shaft and adapted to engage in alternation the gears on said shaft, manually operable means for shifting said clutch member, and means for rotating said transverse shaft.

22. In a removable body truck, in combination, a chassis, a track on said chassis, a body, laterally movable supporting rollers for said body, and means to return said rollers to normal position.

23. In a removable body truck, a chassis frame, a removable body positioned on said frame, cooperative means on said frame and body for moving said body off said frame, means to resiliently elevate said body under normal loads and means cooperative with said elevating means to elevate said body under abnormal loads.

24. In a removable truck, a chassis, a pinion adjustably carried thereby, a body removably disposed on said chassis, a rack connected to said body and adapted to be driven by said pinion, means to resiliently urge said pinion, rack and body upward under normal body loads, and means to positively raise said body when carrying a load greater than the tensile strength of said resiliently urging means.

25. In a removable body truck, a chassis, a pinion adjustably carried thereby, a body removably disposed on said chassis, a rack connected to said body and arranged to be operatively engaged by said pinion, a pivoted lever, a leaf spring secured at one end to said pivoted lever and arranged to resiliently engage said pinion adjustment and means to move said lever about its pivot to adjust said pinion.

26. In a removable body truck, a chassis, a pinion carried thereby, a body removably disposed on said chassis, a rack connected to said body and arranged to be operatively engaged by said pinion, and means to adjust said pinion upwardly including, a pivoted lever, a leaf spring having one end connected to said lever and having its other end arranged to adjust said pinion upwardly under normal loads, and means to reenforce said spring under abnormal loads.

27. The sub-combination comprising a van member adapted to be optionally mounted upon a platform, swiveled caster wheels mounted on the bottom of said van body, said wheels being normally adapted to act as followers and to thereby become automatically aligned during the travel of the van along a surface by frictional contact of said wheels therewith, and supplemental rollers adapted to receive the direct weight of said van when the said wheels are displaced in a vertical plane sufficiently to raise the said wheels out of contact with an underlying platform.

28. In a removable body truck, a chassis frame, a pinion carried by said frame, a body removably disposed upon said chassis, a rack carried by said body, means including a resilient element cooperative with said rack for resiliently elevating said body, and means to positively position said elevating means.

WILLIAM M. BAXTER.